July 19, 1927.
J. A. OLSON ET AL
1,636,012
PISTON RING
Filed May 17, 1926
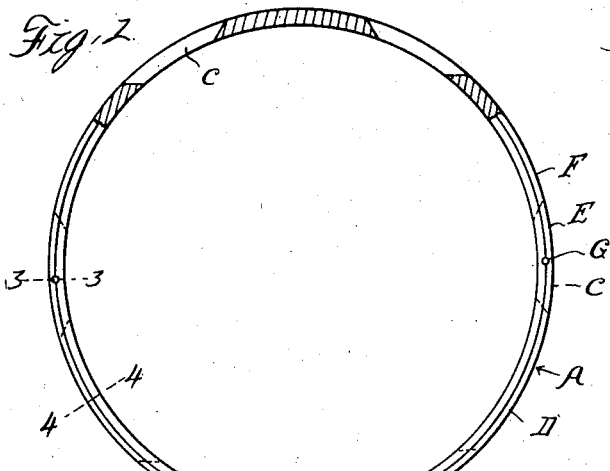
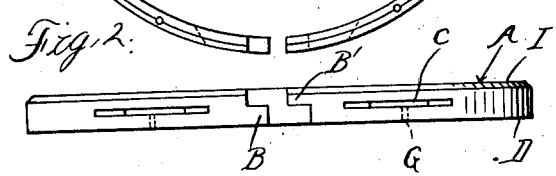
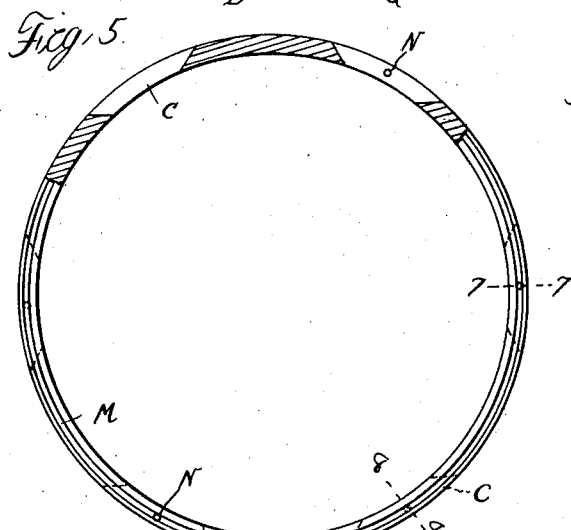
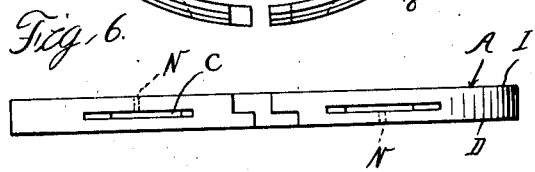
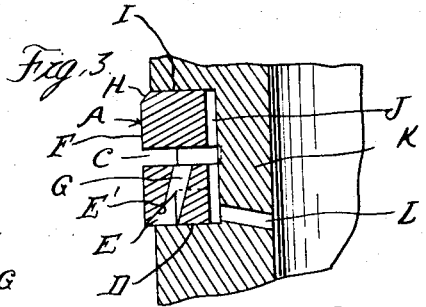
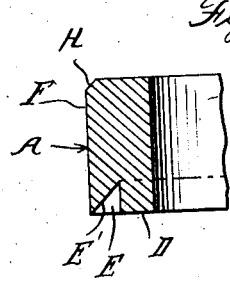
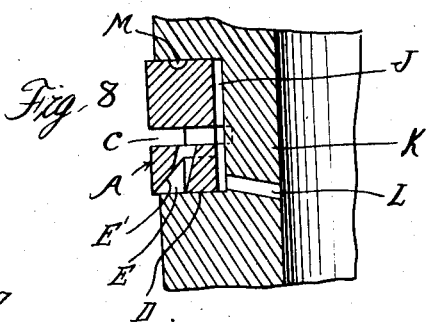
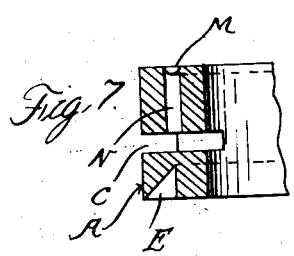
Inventors
John A. Olson
Ernest R. Hellman
By
Attorneys Patented July 19, 1927.

1,636,012

UNITED STATES PATENT OFFICE.

JOHN A. OLSON AND ERNEST R. HELLMAN, OF DETROIT, MICHIGAN.

PISTON RING.

Application filed May 17, 1926. Serial No. 109,741.

The invention relates to piston rings for internal combustion engines and more particularly to a type designed for preventing oil pumping by the piston.

In the present state of the art it is common practice to provide the piston with a ring groove at the lower end of the skirt in which a slotted ring is inserted, the slots serving to convey some of the excess lubricant into the space behind the ring from whence it is allowed to drain into the interior of the piston through holes drilled in the piston walls. One of the objects of our invention is to provide an improved type of slotted piston ring which will more effectually prevent the lubricant passing the ring. Another object is to provide a modified construction having provision allowing a limited amount of oil to be delivered above the ring for the purpose of lubricating the portion of the piston above the same. These and other objects are attained by the novel features of construction as hereinafter set forth and illustrated in the accompanying drawings, wherein:

Figure 1 is a bottom plan view partly in section of one form of our invention.

Figure 2 is a side view thereof.

Figure 3 is an enlarged section on the line 3—3 of Figure 1 also showing the arrangement of the ring in the groove of the piston.

Figure 4 is a similar section on the line 4—4 of Figure 1.

Figure 5 is a top plan view of a modified construction shown partly in section.

Figure 6 is a side elevation thereof.

Figure 7 is an enlarged cross section thereof on the line 7—7 of Figure 5.

Figure 8 is a similar cross section on the line 8—8 of Figure 5.

Referring now to the embodiment of the invention illustrated in Figures 1 to 4 and designated as the oil stop ring, A represents the ring itself of the usual split type, B and B' the overlapping ends of the ring and C a series of slots extending through the ring from the outer to the inner surfaces. The slots are preferably milled into the ring and are therefore of slightly greater extent on the outer surface than on the inner surface. The lower surface D of the ring has formed therein a groove E the outer surface E' of which is of conical form and inclined so as to intersect with the outer cylindrical surface F of the ring thereby providing a sharp annular edge adapted to contact with the cylinder wall. Each of the slots C is placed in communication with the annular groove E by providing a series of drilled apertures G extending upwardly from the groove E in a direction inclined slightly inwardly until intersecting the slot C. The ring is also provided with a beveled surface H between the upper end I and the outer cylindrical surface F.

The ring as above described is inserted in the piston ring groove J in the usual manner and the piston wall K is provided with a downwardly inclined bore L extending from the inner surface of the piston to the lower corner of the groove J. As stated above it is usual to place the oil stop ring in the lowermost groove in the piston while in the head of the piston is provided with the usual type of sealing ring.

In the operation of a piston provided with the improved oil stop ring, the oil adhering to the cylinder walls is allowed to pass by the outer cylindrical surface F of the ring on the upward stroke of the piston and this action is facilitated by the beveled upper surface H. On the downward stroke of the piston the lubricant is scraped from the cylinder walls by the sharp annular lower edge of the ring and collects in the groove E from whence it is passed through the inclined bores G into the slots C. The oil then collects in the portion of the ring groove behind the piston ring and flows downwardly through the bore L into the interior of the piston from whence it is drained back into the crank case. Thus the construction as above described is very effective in preventing lubricant from passing by the ring and entering the portion of the cylinder above the piston.

In certain motors the piston ring of the type above described would be entirely too effective in preventing passage of oil above the ring and might in some cases result in insufficient lubrication of the piston head and the piston rings arranged therein. We have therefore devised a modified form of ring which permits a limited amount of oil to pass through the ring in order to insure the proper lubrication of the cylinder walls and the piston head. This modified construction is illustrated in Figures 5 to 8 wherein the ring is constructed similarly to the one previously described except that the drilled holes G communicate only with the alternate slots C the other slots not being connected to the underside of the ring. In the modified construction it is also preferable to omit the beveled edge H and instead of having a plain upper edge for the ring, it is provided with an annular groove M intermediate the inner and outer surface of the ring and preferably spaced from the same. The ring is then provided with the drilled holes N extending from the groove M through the ring into the slots C, the arrangement being such that the alternate slots are in communication with the opposite ends of the piston ring.

In the operation of a piston provided with the modified form of ring the oil is scraped from the cylinder walls in the same manner as previously described, but a certain amount of the lubricant which is collected in the ring groove J behind the piston ring is carried upward through the slots C and apertures N to the upper groove M, from which point a certain amount is thrown out by inertial forces and lubricates the cylinder walls above the piston ring.

From the above description it will be apparent that we have devised two improved types of piston rings, one of which is particularly adapted for motors where there is a tendency for excessive oil pumping and the other of which is designed for motors where the first type would prevent the necessary lubrication of the piston head.

What we claim as our invention is:

1. A piston ring provided with a sharp annular lower edge adapted to contact with the cylinder wall, a series of slots extending through the ring between the outer and inner surfaces thereof and a drilled hole extending from a point adjacent said edge to one of said slots.

2. A piston ring having a slot extending therethrough from the outer to the inner surface, having an annular groove in the lower surface thereof and having a drilled hole extending between said groove and said slot.

3. A piston ring having an annular groove in the lower edge thereof forming in cross section a V shaped notch the outer surface of which intersects the outer cylindrical surface of the ring at an acute angle, said ring having slots extending outwardly from the inner surface of said ring between the upper and lower edges of said ring, said ring also having a drilled hole inclined upwardly from said groove and intersecting with said slot.

4. A piston ring having a slot extending outwardly from the inner surface of the ring and having a drilled hole between said slot and the upper surface of said ring.

5. A piston ring having a groove in its upper edge and having an aperture extending from the inner surface of the ring to the said groove.

6. A piston ring having a slot extending from the inner to the outer surface, having a groove in its upper edge and having a drilled hole between said groove and said slot.

7. A piston ring provided with a sharp annular lower edge adapted to contact with the cylinder wall, an aperture extending from a point adjacent said edge through said ring to the inner cylindrical surface thereof and an aperture extending through the ring between said inner cylindrical surface and the upper edge of the ring.

8. A piston ring having a series of separate slots extending therethrough intermediate the upper and lower edges, an aperture extending from one of said slots to the lower surface of said ring and an aperture extending from another of said slots to the upper surface of said ring.

9. A piston ring having a series of slots extending from the inner to the outer surface, said ring having the lower edge provided with an annular groove, the outer surface of which intersects with the outer surface of the ring, said ring having its upper surface provided with a series of drilled holes extending from alternate slots to said upper and lower grooves respectively.

10. A piston ring having a series of slots extending outwardly from the inner cylindrical surface, said ring also having a series of drilled holes communicating with said slots, the holes from the alternate slots leading respectively to the upper and lower edges of the ring.

11. The combination with a piston having an annular groove therein, of a piston ring inserted in said groove, said ring being provided with means for collecting the oil from the cylinder walls in said groove behind said ring, and said ring being also provided with a restricted passageway extending from the inner surface thereof to the upper surface whereby a limited amount of lubricant may pass through said ring to a point above the same.

12. The combination with a piston having an annular groove therein, of a piston ring engaging said groove and spaced from the inner cylindrical surface thereof, said ring being provided with a passageway extending from the lower surface thereof to the inner cylindrical surface and being provided with a separate passageway from said inner cylindrical surface to the upper surface of said ring.

13. The combination with a piston having an annular groove therein, of a piston ring engaging said groove, the said ring being provided with means for collecting the oil from the cylinder walls and with means cooperating with the said groove for conducting a portion of the collected oil to the upper surface of the ring.

14. The combination with a piston having an annular groove therein, of a piston ring engaging said groove, the said ring having an oil collecting groove in its lower edge and an oil receiving groove in its upper edge, the said ring being further provided with means cooperating with the groove in the piston for conducting oil from its oil collecting groove to its oil receiving groove.

15. The combination with a piston ring having a slot extending outwardly from its inner surface, of means for supplying oil to said slot, and means for conducting oil from the slot to the upper edge of the ring.

In testimony whereof we affix our signatures.

JOHN A. OLSON.
ERNEST R. HELLMAN.